United States Patent
Terabe

(10) Patent No.: US 8,224,319 B2
(45) Date of Patent: Jul. 17, 2012

(54) MOBILE WIRELESS TERMINAL APPARATUS AND BASE STATION SEARCH METHOD

(75) Inventor: Shigeo Terabe, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 446 days.

(21) Appl. No.: 12/488,831

(22) Filed: Jun. 22, 2009

(65) Prior Publication Data
US 2010/0184430 A1 Jul. 22, 2010

(30) Foreign Application Priority Data
Jan. 19, 2009 (JP) .................. 2009-009358

(51) Int. Cl.
*H04W 4/00* (2009.01)
(52) U.S. Cl. .............. 455/434; 455/435.1; 455/435.2; 455/436; 455/443; 455/574; 370/328; 370/330; 370/331; 370/311
(58) Field of Classification Search ........ 455/432.3, 455/433, 434, 435.1, 435.2, 435.3, 436–444; 370/331–334
See application file for complete search history.

(56) References Cited

U.S. PATENT DOCUMENTS

| | | | | |
|---|---|---|---|---|
| 7,409,214 | B2* | 8/2008 | Lee ........................... | 455/436 |
| 7,869,532 | B2* | 1/2011 | Hayashi et al. ............ | 375/260 |
| 7,924,786 | B2* | 4/2011 | Oh et al. ................... | 370/331 |
| 7,957,352 | B2* | 6/2011 | Vanghi et al. .............. | 370/335 |
| 2006/0176855 | A1* | 8/2006 | Oh et al. ................... | 370/331 |
| 2007/0293224 | A1* | 12/2007 | Wang et al. ............... | 455/436 |
| 2008/0181194 | A1* | 7/2008 | Lindoff et al. ............. | 370/350 |
| 2008/0220784 | A1* | 9/2008 | Somasundaram et al. .. | 455/437 |
| 2008/0293419 | A1* | 11/2008 | Somasundaram et al. .. | 455/437 |
| 2009/0036133 | A1* | 2/2009 | Kim et al. ................. | 455/436 |
| 2009/0042576 | A1* | 2/2009 | Mukherjee et al. ......... | 455/436 |
| 2009/0047963 | A1* | 2/2009 | Kim ........................... | 455/438 |
| 2009/0067370 | A1* | 3/2009 | Kim et al. ................. | 370/328 |
| 2009/0154423 | A1* | 6/2009 | Song et al. ................ | 370/331 |
| 2009/0316659 | A1* | 12/2009 | Lindoff et al. ............. | 370/332 |
| 2010/0046428 | A1* | 2/2010 | Lee et al. .................. | 370/328 |
| 2010/0048210 | A1* | 2/2010 | Iwamura et al. ........... | 455/436 |
| 2010/0087197 | A1* | 4/2010 | Iwamura et al. ........... | 455/436 |
| 2010/0113029 | A1* | 5/2010 | Bjorken .................... | 455/437 |
| 2010/0195621 | A1* | 8/2010 | Kekki et al. ............... | 370/332 |
| 2010/0303041 | A1* | 12/2010 | Diachina et al. ........... | 370/331 |
| 2011/0014920 | A1* | 1/2011 | Nylander et al. ........... | 455/442 |
| 2011/0217972 | A1* | 9/2011 | Kenehan et al. ............ | 455/423 |

OTHER PUBLICATIONS

3G Workshop Part 2 by Agilent Technologies, Jan. 16, 2001, pp. 2-35.
3G Workshop Part 2 by Agilent Technologies, Jan. 16, 2001, pp. 36-50.
Erik Dahlman, "LTE and SAE: Introduction and design targets", Academic Press, 2007, pp. 277-287, 289-355, 357-369.

* cited by examiner

*Primary Examiner* — Kent Chang
*Assistant Examiner* — Magdi Elhag
(74) *Attorney, Agent, or Firm* — Maschoff Gilmore & Israelsen

(57) ABSTRACT

A terminal control unit controls a 1x reception signal process unit, searches for a base station which supports a 1x method, and starts wait for occurrence of signal reception. Then, the terminal control unit periodically executes a nearby base station measuring process, controls the 1x reception signal process unit, and searches for a nearby base station which supports the 1x method. On the other hand, as regards a base station which supports an LTE method, an LTE reception signal process unit is activated to execute a search only in the case where a base station supporting the 1x method, which is used for signal reception wait, does not support the LTE method.

6 Claims, 4 Drawing Sheets

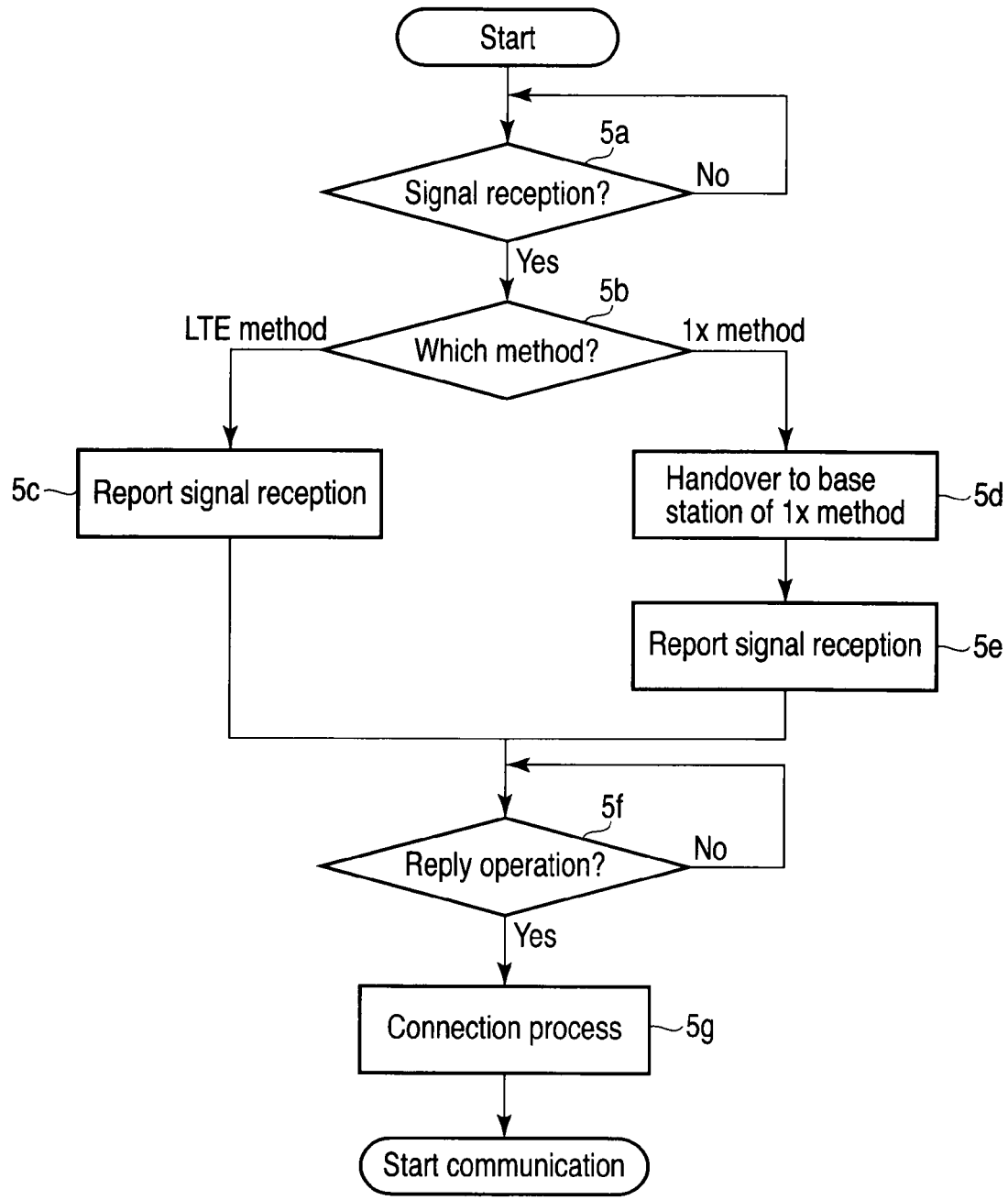
F I G. 5

MOBILE WIRELESS TERMINAL APPARATUS AND BASE STATION SEARCH METHOD

CROSS-REFERENCE TO RELATED APPLICATIONS

This application is based upon and claims the benefit of priority from prior Japanese Patent Application No. 2009-009358, filed Jan. 19, 2009, the entire contents of which are incorporated herein by reference.

BACKGROUND OF THE INVENTION

1. Field of the Invention

The present invention relates to a mobile wireless terminal apparatus for use in a wireless communication system which provides a plurality of wireless connection methods.

2. Description of the Related Art

There has been developed a system wherein a mobile wireless terminal apparatus, which supports two or more different wireless connection methods, periodically receives a paging signal which is sent by a certain wireless communication method, thereby waiting for signal reception with respect to a plurality of wireless communication systems at the same time. In this system, there are two cases: a case in which base stations of different wireless connection methods are installed at geometrically the same position, and a case in which such base stations are installed at different positions.

As the above-described wireless connection methods, the following examples are thinkable: CDMA2000 1x method (see, e.g. 2001 3G Workshop Part 2 by Agilent Technologies, Jan. 16, 2001, pp. 2-35); EV-DO method (see, e.g. 2001 3G Workshop Part 2 by Agilent Technologies, Jan. 16, 2001, pp. 36-50); and LTE (Long Term Evolution) method (see, e.g. Erik Dahlman, Academic Press, 2007, pp. 277-369). In the case of these examples, as regards the CDMA2000 1x method and EV-DO method, the population coverage of the service areas thereof has already reached about 95%. On the other hand, in the LTE method which is newly developed, it is expected that at the beginning of practical use, services will be developed successively from urban areas with high population densities.

In general, a mobile wireless terminal apparatus periodically searches for a nearby base station which enables good-quality communication. If the mobile wireless terminal apparatus has found a nearby base station which is better than the base station that is used for signal reception wait, handover is made to the nearby base station. For example, in the case of a mobile wireless terminal apparatus which supports two wireless connection methods A and B, if signal reception has occurred in the wireless connection method B that is other than the wireless connection method A that is used for signal reception wait, in order to quickly establish the connection by the wireless connection method B, it is necessary to periodically search for the nearby basic station with respect to the wireless connection method B as well as the wireless connection method A.

However, it is not desirable to periodically search for a nearby base station with respect to a plurality of wireless connection methods, since this increases the power consumption at the time of signal reception wait.

In the conventional mobile wireless terminal apparatus which supports a plurality of wireless connection methods, there is a problem that the power consumption at the time of signal reception wait is large, since a nearby base station is periodically searched for with respect to each of the plural wireless connection methods.

BRIEF SUMMARY OF THE INVENTION

The present invention has been made in consideration of the above-described problem, and the object of the invention is to provide a mobile wireless terminal apparatus and a base station search method, which can reduce power consumption at a signal reception wait time in a case where a plurality of wireless connection methods are supported.

In order to achieve the object, the present invention provides a mobile wireless terminal apparatus for use in a wireless communication system which accommodates a first radio base station which executes wireless communication by a first wireless connection method and a second radio base station which executes wireless communication by a second wireless connection method, and executes, via the first radio base station, signal reception for communication via the second radio base station, comprising: reception means for receiving radio signals which are transmitted from the first radio base station and the second radio base station; and search means for periodically searching for the first radio base station in a case where the reception means has received, from the first radio base station, information which is indicative of presence of the second radio base station, and periodically searching for the first radio base station and the second radio base station in a case where the reception means has not received the information.

As has been described above, in the present invention, in the case where the information which is indicative of the presence of the second radio base station has not been received from the first radio base station, a search is periodically executed for the first radio base station and the second radio base station. On the other hand, in the case where this information has been received, a search is periodically executed for the first radio base station.

Therefore, the present invention can provide a mobile wireless terminal apparatus wherein the power consumption at the signal reception wait time can be reduced in the case where a plurality of wireless connection methods are supported, since the search for the second radio base station is executed only in the case where the information which is indicative of the presence of the second radio base station has not been received from the first radio base station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a flow chart for describing the operation of the mobile wireless terminal apparatus shown in FIG. 1.

DETAILED DESCRIPTION OF THE INVENTION

An embodiment of the present invention will now be described with reference to the accompanying drawings.

Figure 1:
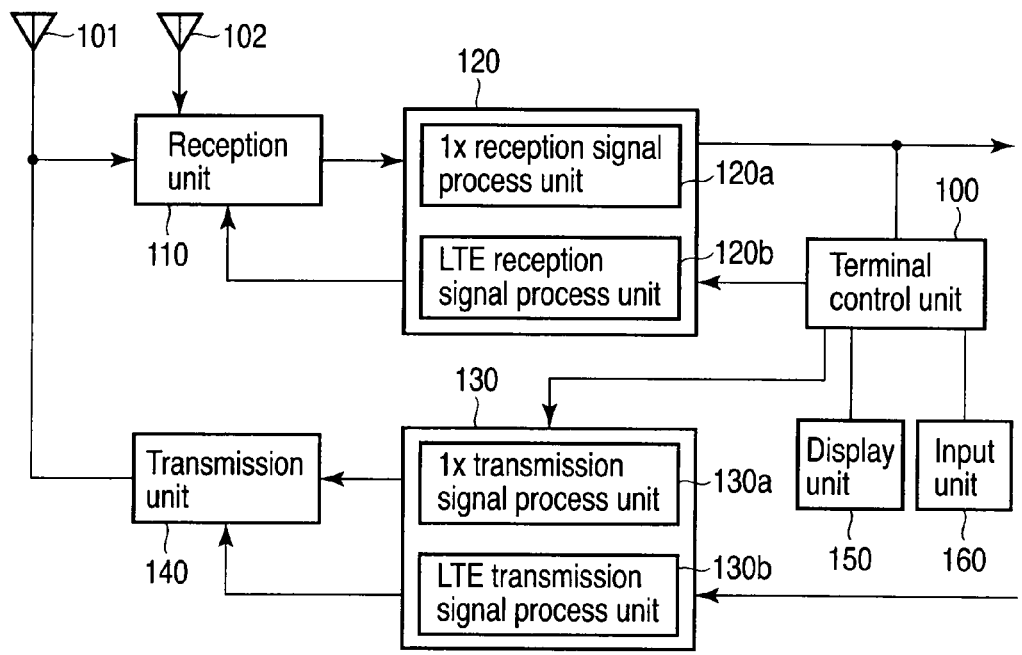
FIG. 1 is a circuit block diagram showing the structure of an embodiment of a mobile wireless terminal apparatus according to the present invention.

FIG. 1 shows the structure of a mobile wireless terminal apparatus according to the embodiment of the invention. As shown in FIG. 1, the mobile wireless terminal apparatus includes a transmission/reception antenna 101, a reception antenna 102, a terminal control unit 100, a reception unit 110, a reception signal process unit 120, a transmission signal process unit 130, and a transmission unit 140. In addition, the mobile wireless terminal apparatus includes a display unit 150 which displays characters and video, and an input unit 160 which receives a request and a number input from a user, as well as a battery and a power supply unit for supplying driving power, a microphone for inputting transmission voice, and a speaker for amplifying and outputting reception voice.

This mobile wireless terminal apparatus can execute communication by two or more different wireless connection methods. The following description is directed to a case, by way of example, where the mobile wireless terminal apparatus supports two wireless connection methods, namely, a CDMA2000 1x method (hereinafter referred to as "1x method") and an LTE (Long Term Evolution) method.

The 1x method can provide, by circuit switching connection, a voice communication service and a low-speed packet communication service of 100 kbps or less. The LTE method provides, by packet switching connection, a high-speed packet service of about 2 Mbps to 20 Mbps, and can also provide a voice call service by VoIP (Voice over Internet Protocol).

Mutually different available frequencies are set for the respective methods. These frequencies are defined as follows. In the 1x method, a frequency f1$d$ is allocated to a downlink from a base station to the mobile wireless terminal apparatus, and a frequency f1$u$ is allocated to an uplink. In the LTE method, a frequency f2$d$ is allocated to a downlink from a base station to the mobile wireless terminal apparatus, and a frequency f2$u$ is allocated to an uplink.

Figure 2:
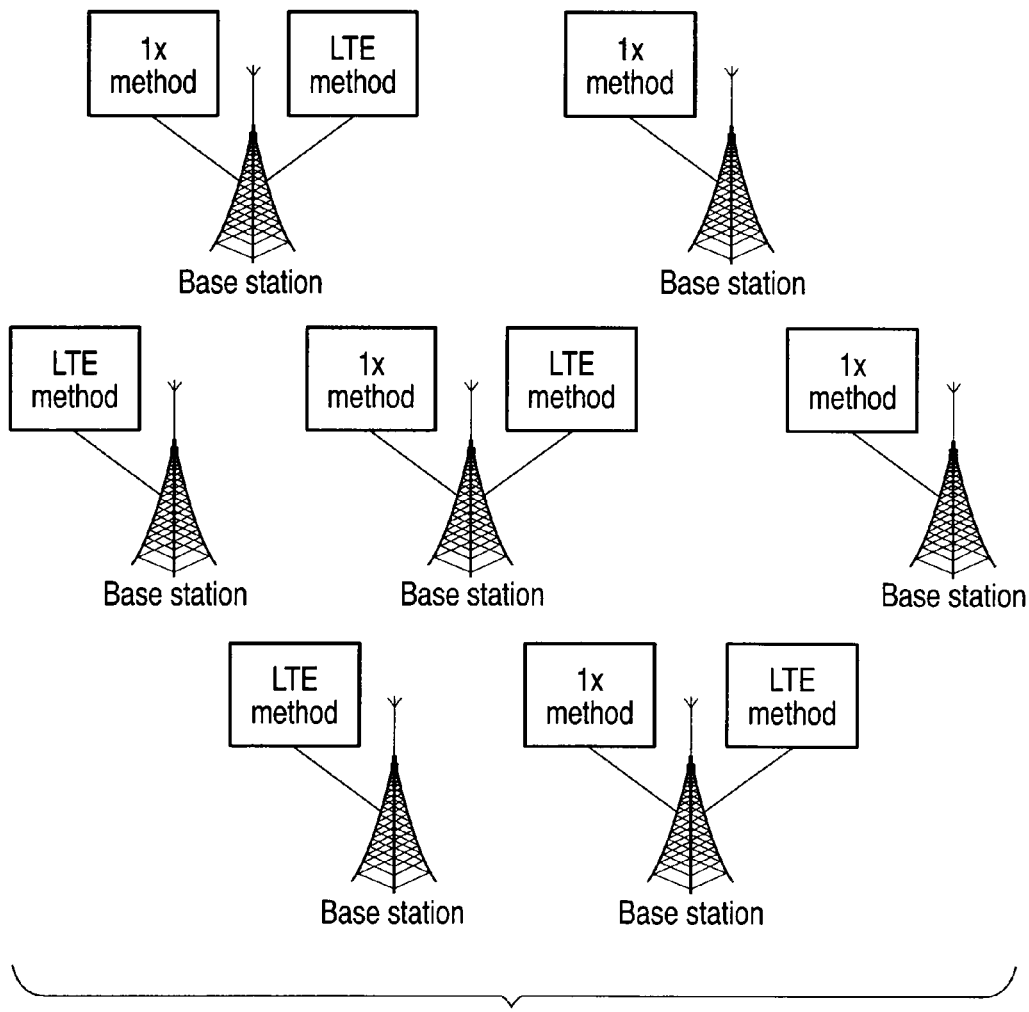
FIG. 2 schematically shows a network-side structure of a wireless communication system according to the invention.

In this wireless communication system, as shown in FIG. 2, there are provided a base station which transmits/receives only a radio signal of the 1x method, a base station which transmits/receives only a radio signal of the LTE method, and a base station which transmits/receives radio signals of both the 1x method and the LTE method, and these station constitute wireless zones which are called "cells".

Figure 3:
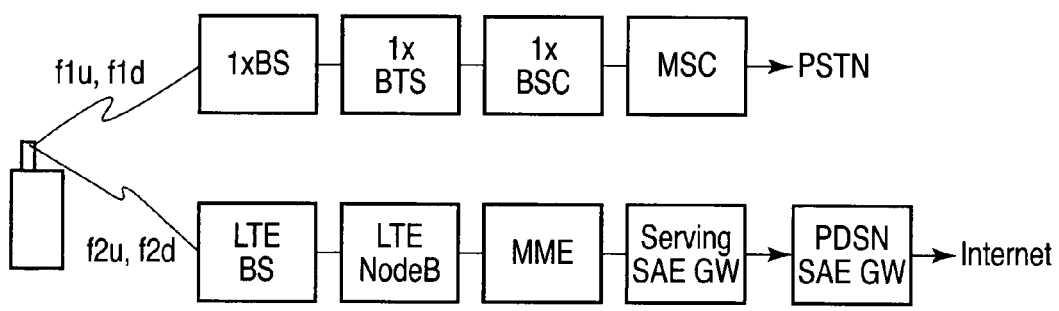
FIG. 3 is a view for describing base stations of the wireless communication system according to the invention.

As shown in FIG. 3, base stations (1x BS) supporting the 1x method are accommodated in a 1xRTT access network which accords to, e.g. 3GPP2A.S0001-A and A.S0008-C. In addition, base stations (LTE BS) supporting the LTE method are accommodate in an E-UTRAN access network which accords to, e.g. 3GPP TS 23.401 v8.2.0 and 3GPP TS23.402 v8.2.0.

Referring back to FIG. 1, the mobile wireless terminal apparatus is described.

A radio signal (frequency f1$d$, f2$d$), which is transmitted from the base station 1x BS, LTE BS, is received by the transmission/reception antenna 101 and the reception antenna 102. The received radio signal is down-converted to a base-band reception signal by the reception unit 110. A local signal, which is used in this down-conversion, is oscillated with a frequency corresponding to the communication method which is designated by the reception signal process unit 120. Thereby, the radio signal (frequency f1$d$ or frequency f2$d$), which is the object of reception, is selected. In addition, the reception unit 110 measures the SN ratio (or the reception power level) of the reception signal of the frequency corresponding to the communication method that is designated by the reception signal process unit 120, and reports the measurement result to the terminal control unit 100 via the reception signal process unit 120.

The reception signal process unit 120 includes a 1x reception signal process unit 120$a$ which supports the 1x method and processes a signal that is received from the base station 1x BS, and an LTE reception signal process unit 120$b$ which supports the LTE method and processes a signal that is received from the base station LTE BS.

The reception signal process unit 120 reports the communication method, which is designated by the terminal control unit 100, to the reception unit 110, and activates one of the 1x reception signal process unit 120$a$ and the LTE reception signal process unit 120$b$, which corresponds to the communication method.

Each of the 1x reception signal process unit 120$a$ and the LTE reception signal process unit 120$b$ executes signal processing corresponding to the associated communication method, and, if activated, demodulates and decodes the base-band reception signal by the signal processing, and acquires reception data.

The transmission signal process unit 130 includes a 1x transmission signal process unit 130$a$ which supports the 1x method and generates a signal which is to be transmitted to the base station 1x BS, and an LTE transmission signal process unit 130$b$ which supports the LTE method and generates a signal which is to be transmitted to the base station LTE BS.

The transmission signal process unit 130 reports the communication method, which is designated by the terminal control unit 100, to the transmission unit 140, and activates one of the 1x transmission signal process unit 130$a$ and the LTE transmission signal process unit 130$b$, which corresponds to the communication method.

Each of the 1x transmission signal process unit 130$a$ and the LTE transmission signal process unit 130$b$ executes signal processing corresponding to the associated communication method, and, if activated, encodes transmission data and then modulates the transmission data, thereby generating a base-band transmission signal.

The transmission unit 140 oscillates a local signal of a frequency corresponding to the communication method which has been reported from the transmission signal process unit 130, and up-converts the base-band transmission signal to a radio frequency by the local signal. Thereby, the radio signal (frequency f1$u$ or frequency f2$u$), which is the object of transmission, is selected. The radio signal is radiated to the space via the transmission/reception antenna 101.

The terminal control unit 100 executes overall control of the respective components of the mobile wireless terminal apparatus. The terminal control unit 100 controls the respective components in order to execute communication by the communication method corresponding to the user's request from the input unit 160, or executes processes, such as selection of the communication method, registration of position and signal reception wait, according to a wait process and a signal reception process which will be described later. By these processes, an efficient cell search (search for the base station 1x BS) is performed in the case of using the 1x method, since the corresponding area of the 1x method is narrower than the area of other methods.

Figure 4:
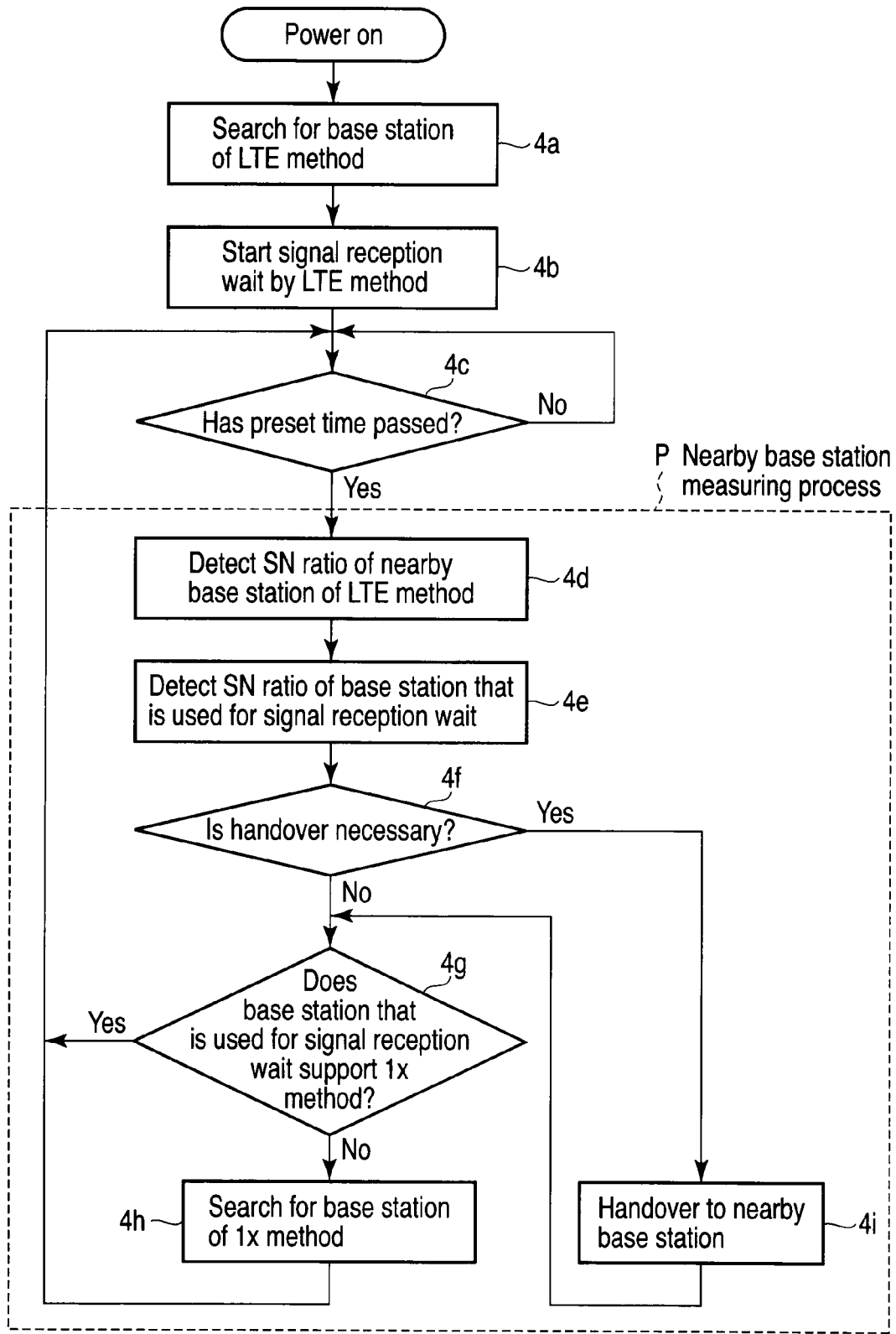
FIG. 4 is a flow chart for describing the operation of the mobile wireless terminal apparatus shown in FIG. 1.

Next, the operation of the mobile wireless terminal apparatus having the above-described structure is described. To begin with, with respect to the 1x method and the LTE method, a description is given of a process from the initial capture to the transition to a wait state immediately after power-on of the mobile wireless terminal apparatus. FIG. 4 is a flow chart illustrating this process. This process is executed by the terminal control unit 100, and the control program and control data relating to this process are prestored in a memory unit which is provided in the terminal control unit 100.

To start with, if power is turned on, the terminal control unit 100, in step 4a, instructs the reception signal process unit 120 and transmission signal process unit 130 to select the LTE method as the communication method. Thereby, the reception signal process unit 120 activates the LTE reception signal process unit 120b and reports the LTE method as the communication method to the reception unit 110. At this time point, neither the 1x reception signal process unit 120a nor the 1x transmission signal process unit 130a operates, and the power consumption relating to the operation thereof is at a minimum level.

On the other hand, the reception unit 110 oscillates a local signal for receiving a radio signal of the LTE method, and down-converts the signal of the frequency f2$u$ to the base band. Similarly, the transmission signal process unit 130 activates the LTE transmission signal process unit 130b and reports the LTE method as the communication method to the transmission unit 140.

Thereafter, the terminal control unit 100 monitors reception data which is output from the reception signal process unit 120 (LTE reception signal process unit 120b), receives a pilot signal which is transmitted from a base station which corresponds to the LTE method, and searches for a base station. The terminal control unit 100 detects a base station with which an optimal SN ratio is obtained, and advances to step 4b.

In step 4b, the terminal control unit 100 instructs the reception signal process unit 120 (LTE reception signal process unit 120b) and the transmission signal process unit 130 (LTE transmission signal process unit 130b) to wait for signal reception via the base station that has been detected in step 4a, and the terminal control unit 100 advances to step 4c. Thereby, according to a predetermined procedure, the terminal control unit 100, the LTE reception signal process unit 120b and the LTE transmission signal process unit 130b communicate with the base station that has been detected in step 4a, executes position registration, and transitions into such a state as to wait for incoming of a reception signal via the base station.

In step 4c, the terminal control unit 100 monitors whether a preset time has passed. If the preset time has passed, the terminal control unit 100 advances to step 4d, and starts a nearby base station measuring process P (steps 4d to 4i). On the other hand, if the preset time has not passed, the terminal control unit 100 further monitors, in step 4c, whether the preset time has passed.

In step 4d, like step 4a, the terminal control unit 100 controls the reception signal process unit 120 and the transmission signal process unit 130, receives a pilot signal which is sent from a nearby base station corresponding to the LTE, detects a nearby base station with an optimal SN ratio, and advances to step 4e.

In step 4e, the terminal control unit 100 controls the reception signal process unit 120 and the transmission signal process unit 130, receives a pilot signal which is sent from the base station that is used for signal reception wait, detects the SN ratio of the pilot signal, and advances to step 4f.

In step 4f, the terminal control unit 100 compares the SN ratio ($SN_E$) of the nearby base station that has been detected in step 4d, and the SN ratio ($SN_C$) that has been detected in step 4e, thereby determining whether handover to the nearby base station is necessary. In this determination, for example, the necessity for the handover is determined according to whether the following formula is satisfied or not:

$$SN_C < SN_E + SN_{TH}.$$

Specifically, if the SN ratio ($SN_E$) of the nearby base station is higher and better than the ($SN_C$) of the base station, which is used for signal reception wait, by more than a threshold ($SN_{TH}$), the necessity for the handover to the nearby base station is determined.

If the handover to the nearby base station is determined to be necessary, the process advances to step 4i. If the handover to the nearby base station is determined to be unnecessary, the process advances to step 4g.

In step 4g, the terminal control unit 100 determines whether the base station that is used for signal reception wait supports not only the LTE method but also the 1x method. In a method of this determination, a base station supporting the LTE method reports information, which is indicative of whether this base station also supports the 1x method, to the mobile wireless terminal apparatus via a common report channel which is inherent to this base station, or the base station reports similar information to the mobile wireless terminal apparatus via an upper-level message.

In the case where the base station that is used for signal reception wait also supports the 1x method, the process goes to step 4c. On the other hand, if the base station that is used for signal reception wait does not support the 1x method, the process advances to step 4h.

In step 4h, the terminal control unit 100 instructs the reception signal process unit 120 and the transmission signal process unit 130 to search for the a base station which supports the 1x method. Thereby, the reception signal process unit 120 activates the 1x reception signal process unit 120a and reports the 1x method as the communication method to the reception unit 110.

Upon receiving this report, the reception unit 110 oscillates a local signal for receiving a radio signal of the 1x method, and down-converts a signal of the frequency f1$u$ to a base band. Then, the terminal control unit 100 monitors reception data which is output from the reception signal process unit 120 (1x reception signal process unit 120a), receives a pilot signal which is transmitted from a base station which corresponds to the 1x method, searches for a base station, detects a base station with which an optimal SN ratio is obtained, and advances to step 4c. If the base station supporting the 1x method is detected, the reception signal process unit 120 stops the operation of the 1x reception signal process unit 120a and suppresses the power consumption.

In step 4i, the terminal control unit 100 instructs the reception signal process unit 120 (LTE reception signal process unit 120b) and the transmission signal process unit 130 (LTE transmission signal process unit 130b) to execute handover to the nearby base station that has been detected in step 4d, and advances to step 4g.

Thereby, according to a predetermined procedure, the terminal control unit 100, the LTE reception signal process unit 120b and the LTE transmission signal process unit 130b communicate with the base station that has been detected in step 4d, executes position registration, and completes the handover, thus transitioning into such a state as to wait for incoming of a reception signal via the nearby base station.

Next, the operation at a signal reception wait time is described. FIG. 5 is a flow chart illustrating the process of this operation. This process is executed by the terminal control unit 100, and the associated control program and control data are prestored in the memory unit which is provided in the terminal control unit 100. This process is executed if a wait state occurs in the process illustrate in FIG. 4.

In step 5a, the terminal control unit 100 monitors reception data which is received by the reception signal process unit 120 (LTE reception signal process unit 120b), and determines whether signal reception to the present mobile wireless terminal apparatus has occurred or not. If signal reception has occurred, the process advances to step 5b. On the other hand, if no signal reception has occurred, the occurrence of signal reception is further monitored in step 5a.

In step 5b, the terminal control unit 100 determines, from the reception data that is indicative of the signal reception detected in step 5a, whether the signal reception that has occurred is of the 1x method or the LTE method. If the signal reception that has occurred is of the LTE method, the process advances to step 5c. On the other hand, if the signal reception that has occurred is of the 1x method, the process advances to step 5d.

In step 5c, the terminal control unit 100 controls the display unit 150 and a sounder (not shown), and reports the occurrence of the signal reception by the LTE method to the user, then advancing to step 5f.

In step 5d, the terminal control unit 100 instructs the reception signal process unit 120 (1x reception signal process unit 120a) and the transmission signal process unit 120 (1x transmission signal process unit 130a) to execute handover to the base station which supports the 1x method, then advancing to step 5e.

Thereby, the 1x reception signal process unit 120a and the 1x transmission signal process unit 130a are activated, and, according to a predetermined procedure, the terminal control unit 100, the 1x reception signal process unit 120a and the 1x transmission signal process unit 130a communicate with the base station that supports the 1x method, executes position registration, completes the handover, and transitions into such a state as to wait for incoming of a reception signal via the base station that supports the 1x method. In this context, the base station that supports the 1x method is a base station which has been detected in step 4h, or a base station which is used for signal reception wait, which supports both the 1x method and the LTE method.

In step 5e, the terminal control unit 100 controls the display unit 150 and the sounder (not shown), and reports the occurrence of the signal reception by the 1x method to the user, then advancing to step 5f.

In step 5f, the terminal control unit 100 monitors the user operation on the input unit 160. If the user executes an operation that is indicative of a response to the signal reception, the terminal control unit 100 advances to step 5g.

In step 5g, the terminal control unit 100 instructs the reception signal process unit 120 and the transmission signal process unit 130 to reply to the reception signal, and finishes the present process. Thereby, according to a predetermined procedure, the terminal control unit 100, the reception signal process unit 120 and the transmission signal process unit 130 communicates with the base station, to which signal reception has been reported, and establish a communication link, thus transitioning to a communicable state. Needless to say, in the case of the signal reception of the LTE method, the LTE reception signal process unit 120b and LTE transmission signal process unit 130b function. On the other hand, in the case of the signal reception of the 1x method, the LTE reception signal process unit 120a and LTE transmission signal process unit 130a function.

As has been described above, the mobile wireless terminal apparatus having the above-described structure searches for a base station corresponding to the LTE method, starts waiting for the occurrence of signal reception, periodically executes the nearby base station measuring process P, and searches for a nearby base station which supports the LTE method. On the other hand, as regards a base station which supports the 1x method, the mobile wireless terminal apparatus activates the 1x reception signal process unit 120a and searches for the base station supporting the 1x method, only in the case where the base station supporting the LTE method, which is used for the signal reception wait, does not support the 1x method.

Thus, according to the mobile wireless terminal apparatus with the above-described structure, a search for a nearby base station supporting the LTE method is periodically executed, but a search for a base station supporting the 1x method is executed only in the case where the base station that is used for signal reception wait does not support the 1x method. Therefore, the power consumption that is needed for the search for the base station supporting the 1x method can be suppressed. In other words, it is possible to reduce the power consumption at the signal reception time in the case where both the 1x method and LTE method are supported.

In the meantime, in the case where the base station supporting the LTE method, which is used for the signal reception wait, supports the 1x method, an incoming signal of the 1x method is awaited via this base station. However, this base station is not always a base station having the best SN ratio of all base stations supporting the 1x method. However, since this base station has the best SN ratio as a base station supporting the LTE method, it is highly possible that this base station has a sufficiently good SN ratio as a base station supporting the 1x method, and no problem arises with the signal reception of the 1x method.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

For example, in the above-described embodiment, the CDMA2000 1x method and LTE method have been described by way of example as the wireless connection methods. The wireless connection methods, however, are not limited to these methods. For example, the invention is applicable to the case in which the EV-DO method is adopted in place of any one of these methods, and the same advantageous effects can be obtained.

Needless to say, the invention can be implemented even in cases where various modifications are made without departing from the spirit or scope of the invention.

What is claimed is:

1. A mobile wireless terminal apparatus for use in a wireless communication system which accommodates a first radio base station which executes wireless communication by a first wireless connection method and a second radio base station which executes wireless communication by a second wireless connection method, and executes, via the first radio base station, signal reception for communication via the second radio base station, comprising:

a reception unit which receives radio signals which are transmitted from the first radio base station and the second radio base station;

a first reception signal process unit which processes a radio signal received from the first radio base station;

a second reception signal process unit which processes a radio signal received from the second radio base station; and a search unit which periodically searches for the first radio base station using the first reception signal process unit activated with the second reception signal process unit being deactivated, if the reception unit has received, from the first radio base station, information which indicates that the first radio base station supports both the first and second wireless connection methods, and periodically searches for the first radio base station and the second radio base station using the first reception signal process unit activated and the second reception signal process unit activated respectively, if the reception unit has not received the information.

2. A mobile wireless terminal apparatus for use in a wireless communication system which accommodates a first radio base station which executes wireless communication by a first wireless connection method and a second radio base station which executes wireless communication by a second wireless connection method, and executes, via the first radio base station, signal reception for communication via the second radio base station, comprising:

a reception unit which receives radio signals which are transmitted from the first radio base station and the second radio base station;

a first reception signal process unit which processes a radio signal received from the first radio base station;

a second reception signal process unit which processes a radio signal received from the second radio base station;

a first search unit which searches for the first radio base station using the first reception signal process unit activated each time a preset time has passed; and a second search unit which does not search for the second radio base station with the second reception signal process unit being deactivated, if the reception unit has received, from the first radio base station, information which indicates that the first radio base station supports both the first and second wireless connection methods, and searches for the second radio base station using the second reception signal process unit activated, if the reception unit has not received the information.

3. A mobile wireless terminal apparatus for use in a wireless communication system which accommodates a first radio base station which is capable of executing wireless communication by a first wireless connection method, a second radio base station which is capable of executing wireless communication by the first wireless connection method and a second wireless communication method, and a third radio base station which is capable of executing wireless communication by the second wireless connection method, and is capable of executing, by the first wireless connection method, signal reception for communication by the second wireless connection method, comprising:

a wireless communication unit which executes wireless communication with a radio base station by using the first wireless connection method and the second wireless connection method;

a determination unit which determines, on the basis of information which the wireless communication unit has received from the radio base station, whether the radio base station, which waits for signal reception by the first wireless connection method, is the first radio base station or the second wireless base station;

a first reception signal process unit which processes a radio signal received from the first radio base station or the second radio base station;

a second reception signal process unit which processes a radio signal received from the second radio base station or the third radio base station; and a search unit which periodically searches for the second radio base station or the third radio base station using the second reception signal process unit activated, on the basis of a determination result of the determination unit, if signal reception is awaited via the first radio base station using the first reception signal process unit activated with the second reception signal process unit being deactivated.

4. A base station search method of a mobile wireless terminal apparatus for use in a wireless communication system which accommodates a first radio base station which executes wireless communication by a first wireless connection method and a second radio base station which executes wireless communication by a second wireless connection method, and executes, via the first radio base station, signal reception for communication via the second radio base station, comprising:

a reception step of receiving radio signals which are transmitted from the first radio base station and the second radio base station;

a first reception signal processing step wherein a radio signal received from the first radio base station is processed;

a second reception signal processing step wherein a radio signal received from the second radio base station is processed; and a search step of periodically searching for the first radio base station during the first reception signal processing step which is performed without the second reception signal processing step being performed, if information which indicates that the first radio base station supports both the first and second wireless connection methods, and periodically searching for the first radio base station and the second radio base station using both the first reception signal processing step and the second reception signal processing step if the information has not been received.

5. A base station search method of a mobile wireless terminal apparatus for use in a wireless communication system which accommodates a first radio base station which executes wireless communication by a first wireless connection method and a second radio base station which executes wireless communication by a second wireless connection method, and executes, via the first radio base station, signal reception for communication via the second radio base station, comprising:

a reception step of receiving radio signals which are transmitted from the first radio base station and the second radio base station;

a first reception signal processing step wherein a radio signal received from the first radio base station is processed;

a second reception signal processing step wherein a radio signal received from the second radio base station is processed;

a first search step of searching for the first radio base station using the first reception signal processing step each time a preset time has passed; and a second search step of not searching for the second radio base station without performing the second reception signal processing step, if information which indicates that the first radio base station supports both the first and second wireless connection methods, and searching for the second radio base station by performing both the first reception signal processing step and the second reception signal processing step if the information has not been received.

6. A base station search method of a mobile wireless terminal apparatus for use in a wireless communication system which accommodates a first radio base station which is capable of executing wireless communication by a first wireless connection method, a second radio base station which is capable of executing wireless communication by the first wireless connection method and a second wireless communication method, and a third radio base station which is capable of executing wireless communication by the second wireless connection method, and is capable of executing, by the first wireless connection method, signal reception for communication by the second wireless connection method, comprising:

a wireless communication step of executing wireless communication with a radio base station by using the first wireless connection method and the second wireless connection method;

a determination step of determining, on the basis of information which has been received from the radio base station in the wireless communication step, whether the radio base station, which waits for signal reception by the first wireless connection method, is the first radio base station or the second wireless base station;

a first reception signal processing step wherein a radio signal received from the first radio base station is processed;

a second reception signal processing step wherein a radio signal received from the second radio base station is processed; and a search step of periodically searching for the second radio base station or the third radio base station using the second reception signal processing step, on the basis of a determination result of the determination step, if signal reception is awaited via the first radio base station using only the first reception signal processing step without performing the second reception signal processing step.

\* \* \* \* \*